United States Patent
Katsura et al.

(10) Patent No.: US 6,778,520 B2
(45) Date of Patent: *Aug. 17, 2004

(54) RADIO COMMUNICATION APPARATUS AND METHOD

(75) Inventors: Eiji Katsura, Kawasaki (JP);
Masatoshi Watanabe, Yokohama (JP);
Osamu Kato, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/805,508

(22) Filed: Mar. 14, 2001

(65) Prior Publication Data

US 2001/0007551 A1 Jul. 12, 2001

Related U.S. Application Data

(62) Division of application No. 09/284,956, filed as application No. PCT/JP97/03321 on Sep. 19, 1997.

(51) Int. Cl.[7] .............................................. H04B 7/216
(52) U.S. Cl. ...................... 370/342; 370/310; 370/318; 370/331
(58) Field of Search ................................ 370/310, 324, 370/331, 318, 332, 342, 336, 350; 455/442, 437, 502, 524

(56) References Cited

U.S. PATENT DOCUMENTS

| | | | | |
|---|---|---|---|---|
| 5,483,668 A | * | 1/1996 | Malkamadi et al. | 455/442 |
| 5,574,983 A | * | 11/1996 | Douzono et al. | 455/69 |
| 5,625,627 A | * | 4/1997 | Ishi | 370/347 |
| 5,722,074 A | * | 2/1998 | Muszynski | 455/442 |
| 5,722,080 A | * | 2/1998 | Kondo | 455/502 |
| 5,828,659 A | * | 10/1998 | Teder et al. | 370/328 |
| 6,112,088 A | * | 8/2000 | Haartsen | 455/437 |
| 6,122,512 A | * | 9/2000 | Bodin | 455/440 |
| 6,154,657 A | * | 11/2000 | Grubeck et al. | 455/456 |
| RE37,685 E | * | 4/2002 | Uddenfeldt et al. | 455/442 |

FOREIGN PATENT DOCUMENTS

| | | |
|---|---|---|
| EP | 0676908 | 10/1995 |
| EP | 0699011 | 2/1996 |
| JP | 5252100 | 9/1993 |
| JP | 7107033 | 4/1995 |
| JP | 865738 | 3/1996 |
| JP | 974378 | 3/1997 |
| JP | 9261162 | 10/1997 |
| WO | 9430024 | 12/1994 |

OTHER PUBLICATIONS

Kojiro et al. "Forward Link Capacity of a DS/CDMA System with Soft Handover," with English language preface.
PCT International Search Report dated Dec. 16, 1997.

* cited by examiner

Primary Examiner—John Pezzlo
Assistant Examiner—Saba Tsegaye
(74) Attorney, Agent, or Firm—Stevens, Davis, Miller & Mosher, LLP

(57) ABSTRACT

A radio communication apparatus and system in a CDMA/TDD system includes a mobile station that detects received power of data received from a surrounding base station at a received power detecting circuit in switching a base station for communication while moving. When received power from a base station other than a main base station in current communication becomes higher than a predetermined level, the mobile station makes the base station a sub base station to transmit the same data as the main base station, and receives data from the main base station and the sub base station concurrently at a pair of correlators. After that, when the received power from the sub base station becomes higher than the received power from the main base station, the mobile station switches a main base station and a sub base station and transmits data to a new main base station.

7 Claims, 6 Drawing Sheets

FIG. 3
(a) WHEN MOBILE STATION IS PRESENT NEAR BASE STATION A
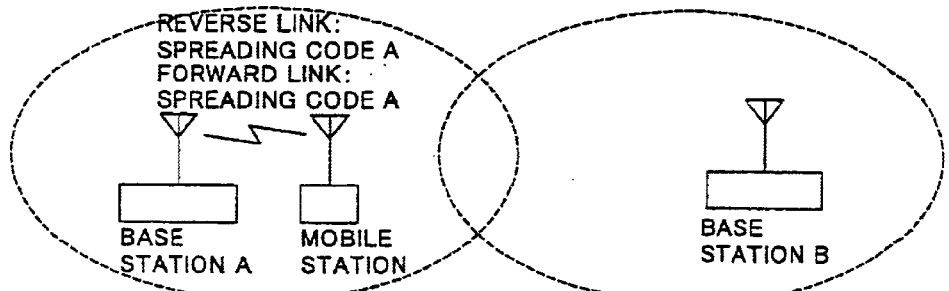
(b) MOBILE STATION COMES CLOSE TO INTERMEDIATE AREA BETWEEN BASE STATION A AND BASE STATION B
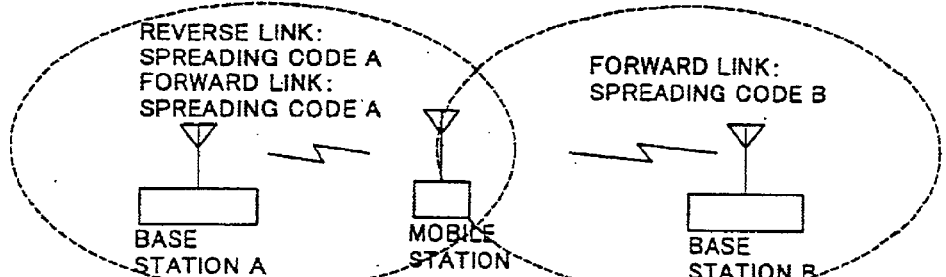
(c) MOBILE STATION CROSSES OVER TO INTERMEDIATE AREA BETWEEN BASE STATION A AND BASE STATION B
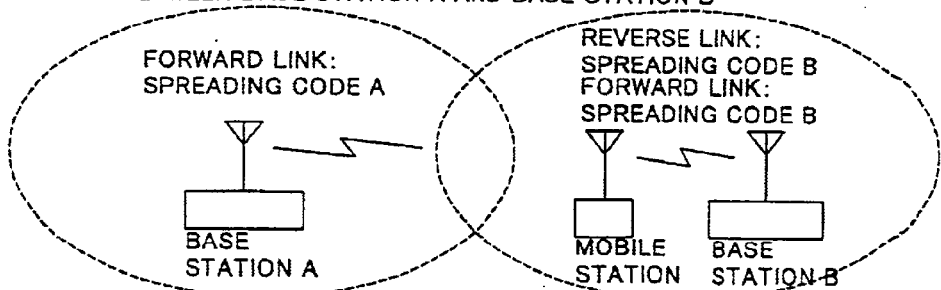
(d) MOBILE STATION COMES CLOSE TO BASE STATION B
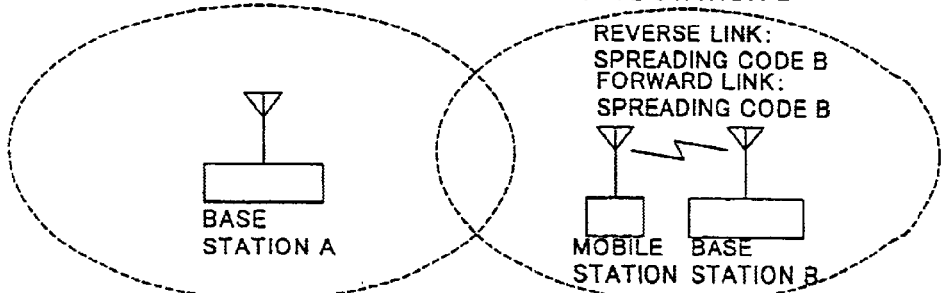

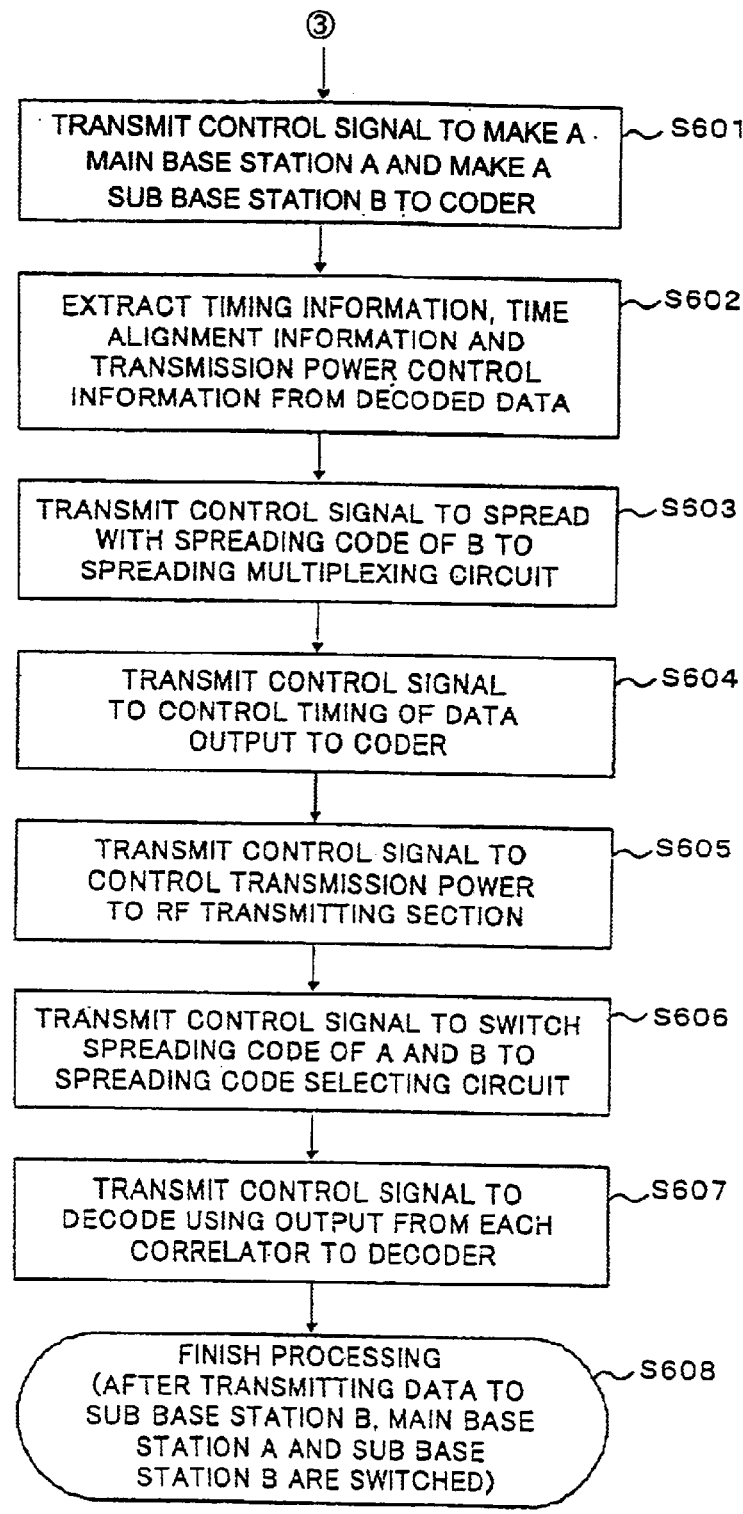

RADIO COMMUNICATION APPARATUS AND METHOD

This application is a division of Ser. No. 09/284,956 filed May 4, 1999 which is a 371 of PCT/JP97/03321 filed Sep. 19, 1997.

TECHNICAL FIELD

The present invention relates to a radio communication apparatus and method used in a car telephone, a portable telephone or the like.

BACKGROUND ART

In a cellular radio communication system for a car telephone, a portable telephone or the like, as a multiple access system for transmission signals in which a plurality of stations communicate concurrently at the same frequency band, a FDMA system, a TDMA system and so on are known. Recently, a CDMA system (Code Division Multiple Access system) has been applied as a system in which higher frequency utilization is obtained and more system users are accommodated than other techniques such as the FDMA system, the TDMA system and so on.

In addition, there are a FDD system and a TDD system as a transmission system to perform a bi-directional communication of transmission data over forward link and reverse link between a mobile station and a base station in a cellular system. The FDD system utilizes different frequency bands in forward and reverse links. The TDD system utilizes the same frequency band and transmits forward link signals and reverse link signals using time slots. Accordingly, a CDMA/TDD mobile station apparatus is a mobile station apparatus using the CDMA system as a multiple access system and the TDD system as a system for discriminating the forward link and reverse link.

The configuration of a conventional CDMA/TDD mobile station apparatus will be explained below using a block diagram in FIG. 1.

As illustrated in FIG. 1, a mobile station comprises antenna 101 via which data is transmitted and received to and from a base station, switch 102 to switch a time band for transmitting and receiving, RF receiving section 103 to convert the received data passed through switch 102 to baseband signals, AD converter 104 to convert the data converted at RF receiving section 103 to digital data, correlator 105 to despread the data converted at AD converter 104 with a spreading code and decoder 106 to decode the data despread at correlator 105.

Further, the mobile station comprises synchronization circuit 107 to generate synchronization signals used in despreading at correlator 105 from an output from AD converter 104 and to generate frame synchronization signals from the decoded data, and timing generation circuit 108 to generate switching timing signals for switch 102 based on the frame synchronization signals output from synchronization circuit 107.

Furthermore, the mobile station comprises coder 111 to code transmission data, spreading multiplexing circuit 112 to spectrum spread the data coded at coder 111 to multiplex each channel, DA converter 113 to convert the data spread at spreading multiplexing circuit 112 to analog data, and RF transmitting section 114 to convert the data converted at DA converter 113 to RF data.

Furthermore, the mobile station comprises control circuit 120 to control the whole apparatus such as transmission power, frame configuration and so on.

The mobile station configured as described above selects receiving or transmitting by switch 102 corresponding to a control signal output from timing generation circuit 108. In the case of selecting receiving, it decodes the data received from a base station using antenna 101, RF receiving section 103, AD converter 104, correlator 105, and decoder 106. On the other hand, in the case of selecting transmitting, it transmits transmission data to a base station using coder 111, spreading multiplexing circuit 112, DA converter 113, RF transmitting section 114 and antenna 101. The switching timing of switch 102 is provided from timing generation circuit 108 based on the frame synchronization signals generated at synchronization circuit 107. The control of each section in the mobile station is carried out by control circuit 120.

In the conventional CDMA/TDD system mobile station described above, when the mobile station moves from a cell of a base station in current communication to another cell of another base station for next communication, control circuit 120 performs a switching of transmission and reception frequencies or a spreading code in order to communicate with a base station for the new communication.

However, there has been a problem that the conventional CDMA/TDD system mobile station described above has no hand-over system that is efficient to switch a base station quickly, therefore it takes a time to acquire synchronization with the base station for new communication and the mobile station has to discontinue communication temporally while it moves from a cell of a base station in current communication to another cell of another base station for next communication.

DISCLOSURE OF INVENTION

It is an object of the present invention to provide a CDMA mobile station apparatus capable of switching a base station in a short time while it moves from a cell of a base station in current communication to another cell of another base station for next communication and preventing transmission property from being deteriorated even in the case where the mobile station is present around a boundary between the cells of two base stations.

The object is achieved according to the following steps: First, a mobile station detects reception power of data received from surrounding base stations, and when a level of the received power from a base station that is not the main base station in current communication becomes higher than a predetermined level, determines this base station as a sub base station, then transmits and receives data to and from the sub base station concurrently along with the main base station. After that, when the received power from the sub base station becomes higher than that from the main base station, the mobile station switches the main base station and the sub base station so as to transmit data to a new main base station.

BRIEF DESCRIPTION OF DRAWINGS

FIG. 3 is a schematic diagram illustrating a switching operation performed by a base station as a mobile station moves according to the above embodiment; and FIGS. 4 to 6 are flow charts illustrating the processing flow of a control circuit in a CDMA mobile station apparatus according to the above embodiment.

BEST MODE FOR CARRYING OUT THE INVENTION

An embodiment of the present invention will be described below in detail using the accompanying figures. In addition, this embodiment describes about the case of using a CDMA apparatus as a multiple access system and a TDD system as a system for discriminating forward link and reverse link.

Figure 1:
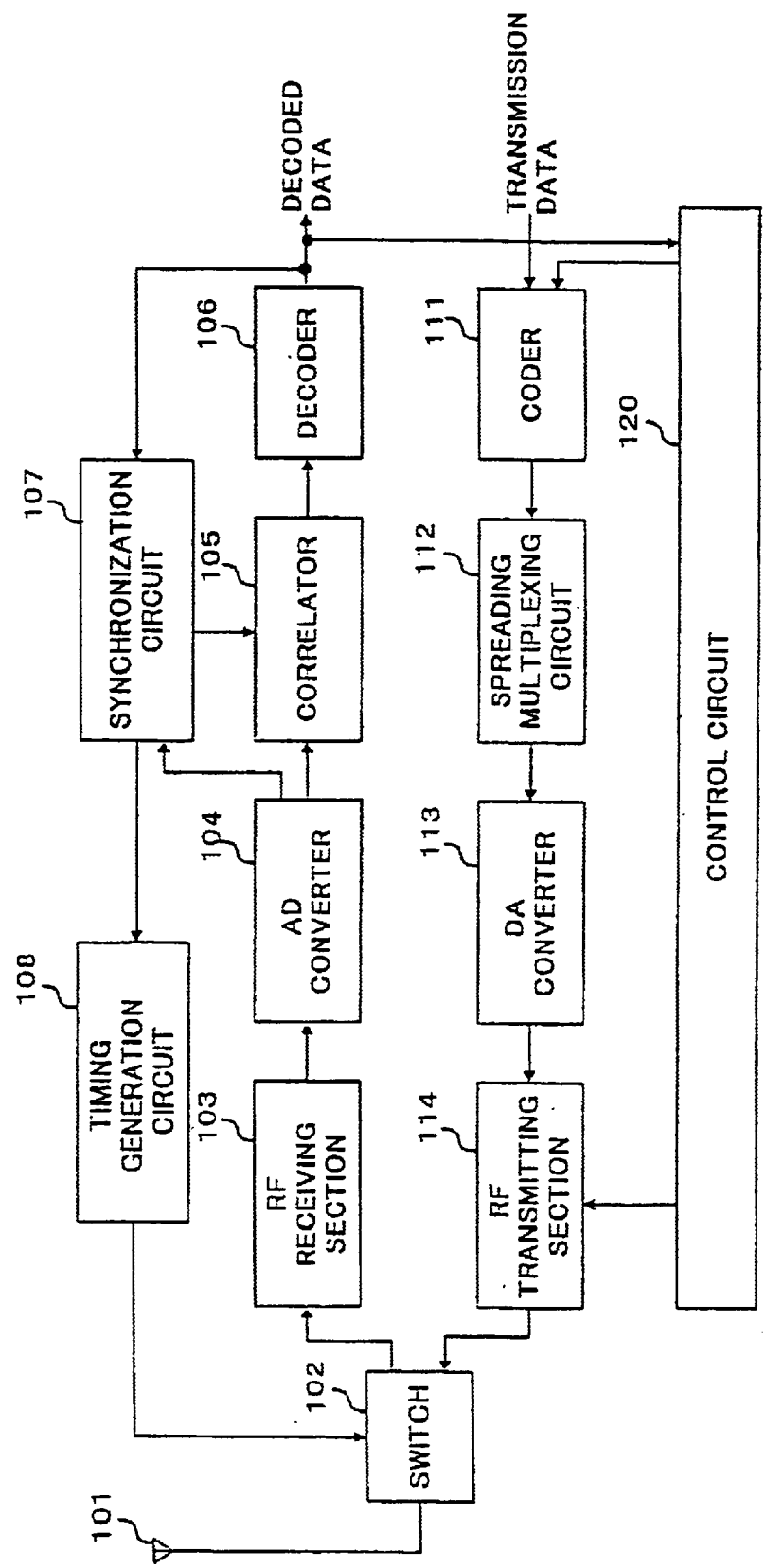
FIG. 1 is a block diagram illustrating a configuration of a conventional CDMA/TDD system mobile station apparatus.
Figure 2:
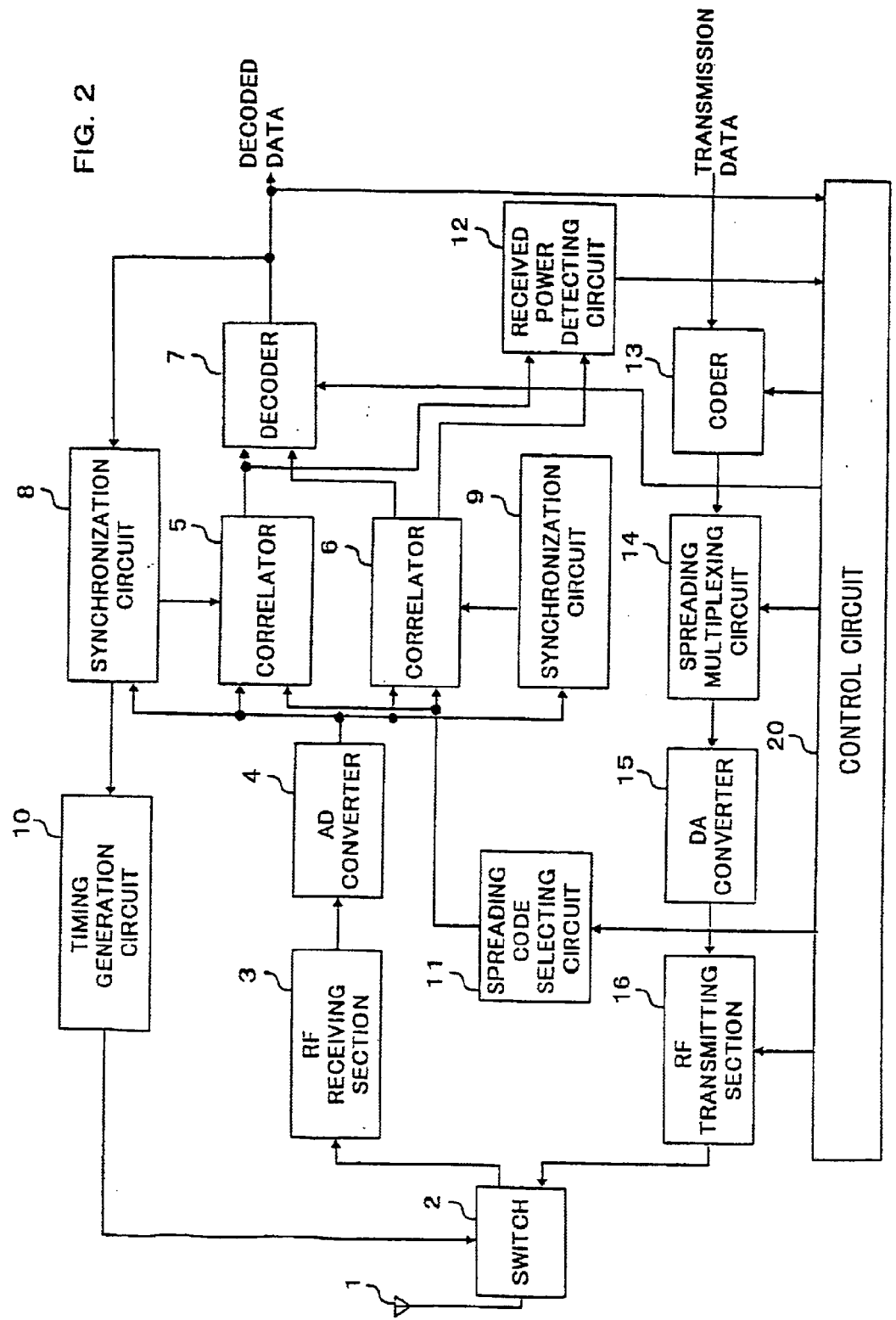
FIG. 2 is a block diagram illustrating a configuration of a CDMA/TDD system mobile station apparatus according to an embodiment of the present invention.

FIG. 2 is a block diagram illustrating a configuration of a CDMA/TDD system mobile station apparatus according to the embodiment of the present invention.

As illustrated in FIG. 2, the mobile station comprises antenna 1 at which data is transmitted and received to and from a base station, switch 2 to switch time band for transmitting and receiving, RF receiving section 3 to convert the received data passed through switch 102 to baseband signals, AD converter 4 to convert the data converted at RF receiving section 3 to digital data, correlator 5 and correlator 6 to despread the data converted at AD converter 4 with spreading codes and decoder 7 to decode the data despread at correlator 5 and correlator 6.

Further, the mobile station according to the embodiment of the present invention comprises synchronization circuit 8 to generate synchronization signals used in despreading at correlator 5 using an output from AD converter 4 and generate frame synchronization signals using the decoded data, and timing generation circuit 10 to generate switching timing signals for switch 2 based on the frame synchronization signals output from synchronization circuit 8, spreading code selecting circuit 11 to generate signals for selecting spreading code used at correlator 5 and correlator 6 and received power detecting circuit 12 to detect a received level of data output from correlator 5 and correlator 6.

Furthermore, the mobile station according to the embodiment of the present invention comprises coder 13 to perform coding of transmission data, spreading multiplexing circuit 14 to spectrum spread the data coded at coder 13 and multiplex each channel, DA converter 15 to convert the data spread at spreading multiplexing circuit 14 to analog data, and RF transmitting section 16 to convert the data converted at DA converter 15 to RF data.

In addition, the mobile station according to the embodiment of the present invention comprises control circuit 20 to control the whole apparatus.

The control circuit 20 detects power of received signals from surrounding base stations based on the detection of received power at received power detecting circuit 12, transmits base station switching information to each base station while selecting a base station in current communication and a sub base station that is a base station for next communication.

Further, control circuit 20 transmits a control signal to communicate with the sub base station, a control signal to switch functions of the main base station and sub base station, a control signal to terminate the communication with the switched sub base station and a control signal to control timing for data transmission to coder 13. At this point, time alignment information included in the received data from the base station is utilized to control the timing of data transmission.

The time alignment is, in mobile stations having different distances from the base station, to correct a difference of an arrival time of transmission burst at the base station at each mobile station side by adjusting the transmission timing.

Furthermore, control circuit 20 transmits a control signal to select the spreading codes for correlator 5 and correlator 6 to spreading code selecting circuit 11, a control signal to select the spreading code to spreading multiplexing circuit 14, a control signal to instruct to use both correlation value data of the main base station and sub base station to decode in the case of communicating with the sub base station to decoder 7 and a control signal to control transmission power to RF transmitting section 16. At this point, the control information included in the received data from the base station is utilized to control the transmission power.

The transmission power control and time alignment are carried out for the main base station. However, when a main base station and a sub base station are switched, the transmission power and time alignment information of the sub base station is received before the base station is switched. The use of this information enables the control circuit to quickly switch a main base station and a sub base station.

The receiving operation in the CDMA/TDD system mobile station apparatus configured as described above will be described.

First, in the case where switch 2 is selected for receiving, received data received by antenna 1 from a base station is converted to a baseband signal at RF receiving section 3 and quantized at AD converter 4. The digital data output from AD converter 4 is input to correlator 5, correlator 6, synchronization circuit 8 and synchronization circuit 9.

The data input to correlator 5 and correlator 6 are respectively despread with corresponding spreading codes selected at spreading code selecting circuit 11 then output to decoder 7. At this point, synchronization is acquired by synchronization signals output from synchronization circuits 8 and 9. The data input to decoder 7 is decoded then output to the main body of the mobile station as decoded data.

In addition, the decoded data is also output to control circuit 20 and synchronization circuit 8. A frame synchronization signal is generated from the decoded data at synchronization circuit 8 and output to timing generation circuit 10, based on which, switching of transmitting and receiving at switch 2 is executed.

In addition, received power detecting circuit 12 monitors the received power from a base station around the mobile station using outputs from correlator 5 and correlator 6 and outputs data indicating a level of the received power to control circuit 20.

Next, the transmitting operation in the CDMA/TDD system mobile station apparatus will be described.

First, the transmission data is coded then constructed into a frame with control data at coder 13 and output to spreading multiplexing circuit 14. In addition, the output timing for the data coded at coder 13 is controlled by a control signal for time alignment from control circuit 20.

The coded data is spectrum spread at spreading multiplexing circuit 14, multiplexed with each channel to be transmitted, and output to DA converter 15. The spreading code used in spreading is selected by a control signal from control circuit 20.

The digital spectrum spread multiplexed data is converted to an analog signal at DA converter 15 then converted to a RF signal at RF transmitting section 16. The RF signal is output from antenna 1 when switch 2 is selected for transmission. The transmission power of the RF signal is controlled at RF transmitting section 16 by the transmission power control signal from control circuit 20.

Next, the operation for switching a base station in a CDMA mobile station according to the embodiment of the present invention will be described with the schematic diagram in FIG. 3.

As illustrated in FIG. 3(a), when a mobile station is present at a position near base station A, the mobile station communicates with base station A using spreading code A while detecting the levels of the received power from base station A and base station B at received power detecting circuit 12. The mobile station utilizes a correlation value output from correlator 5 to detect the received power from base station A in current communication and utilizes another correlation value output from correlator 6 to detect the received power from a surrounding base station. At this time, control circuit 20 performs the transmission power control and time alignment control to base station A in current communication.

When the mobile station comes close to the intermediate area between base station A and base station B, as illustrated in FIG. 3(b), while gradually moving toward base station B, and then detects that the received power from base station B becomes higher than a predetermined level at received power detecting circuit 12, control circuit 20 at the mobile station transmits a control signal to communicate with base station B as a sub base station to coder 13.

Base station A receives the control information from the received data and transmits the control information to make base station B operate as the sub base station for the mobile station to base station B. When base station B receives this control information, base station B transmits the same information as the base station to the mobile station using spreading code B that is different from base station A.

The mobile station obtains the data of base station A as the main base station at correlator 5, while obtaining the data of base station B as the sub base station at correlator 6, and then obtains the decoded data using the data output from correlator 5 and correlator 6. The data to be transmitted from the mobile station is spread with spreading code A of base station A. In addition, the transmission power control and time alignment are also performed in response to base station A.

As described above, since the mobile station receives the data from the sub base station while communicating with the main base station, and then obtains the data necessary for switching a communication partner before switching the base station, it is possible to perform the switching of communication partner quickly.

As illustrated in FIG. 3(c), when the mobile station crosses over the intermediate area between base station A and base station B, further moves toward base station B, and detects that the received power from base station B becomes higher than that from base station A, control circuit 20 in the mobile station transmits a control signal to make base station A sub base station and make base station B main base station to coder 13.

Base station A receives the control information from the received data, operates as the sub base station of the mobile station and transmits data using spreading code A. When base station B receives the control information from the received data, base station B transmits the same data as that base station A transmits to the mobile station using spreading code B.

The mobile station obtains the data at correlator 5 from base station B as the main base station, while obtaining the data at correlator 6 from base station A as the sub base station, and then obtains the decoded data using the data output from correlator 5 and correlator 6. The data to be transmitted from the mobile station is spread with spreading code B of base station B. In addition, the transmission power control and time alignment are also performed in response to base station B.

In the operation of switching a base station according to this embodiment, it is not necessary to acquire synchronization since the synchronization is already acquired with base stations A and B, and the control information on transmission power and time alignment has been already transmitted to the mobile station since base station B was the sub base station. Therefore it is possible to perform the switching of base station in a short time.

When the mobile station further moves toward base station B and is present at a position near base station B as illustrated in FIG. 3(d), control circuit 20 of the mobile station transmits a control signal to terminate the communication with the sub base station A to coder 13. Base station B receives the control information from the received data, and transmits the control information to make base station A cease operating as a sub base station to base station B. When base station A receives this control transmission, base station A stops operating as the sub base station.

As described above, in switching a base station during a move, the mobile station according to this embodiment detects the received power of the data received from a surrounding base station at received power detecting circuit 12. When the received power from another base station that is not the main base station in current communication becomes higher than a predetermined level, the mobile station transmits data containing the control information to make the another base station transmit data as a sub base station at the same tine as the main base station to the main base, and the main base station transmits this control information to the sub base station. Further, the mobile station concurrently receives data from the main base station and sub base station at correlator 5 and correlator 6. After that, when the received power of the sub base station becomes higher than that of the main base station, the mobile station switches a main base station and a sub base station to transmit data to a new base station.

Figure 4:
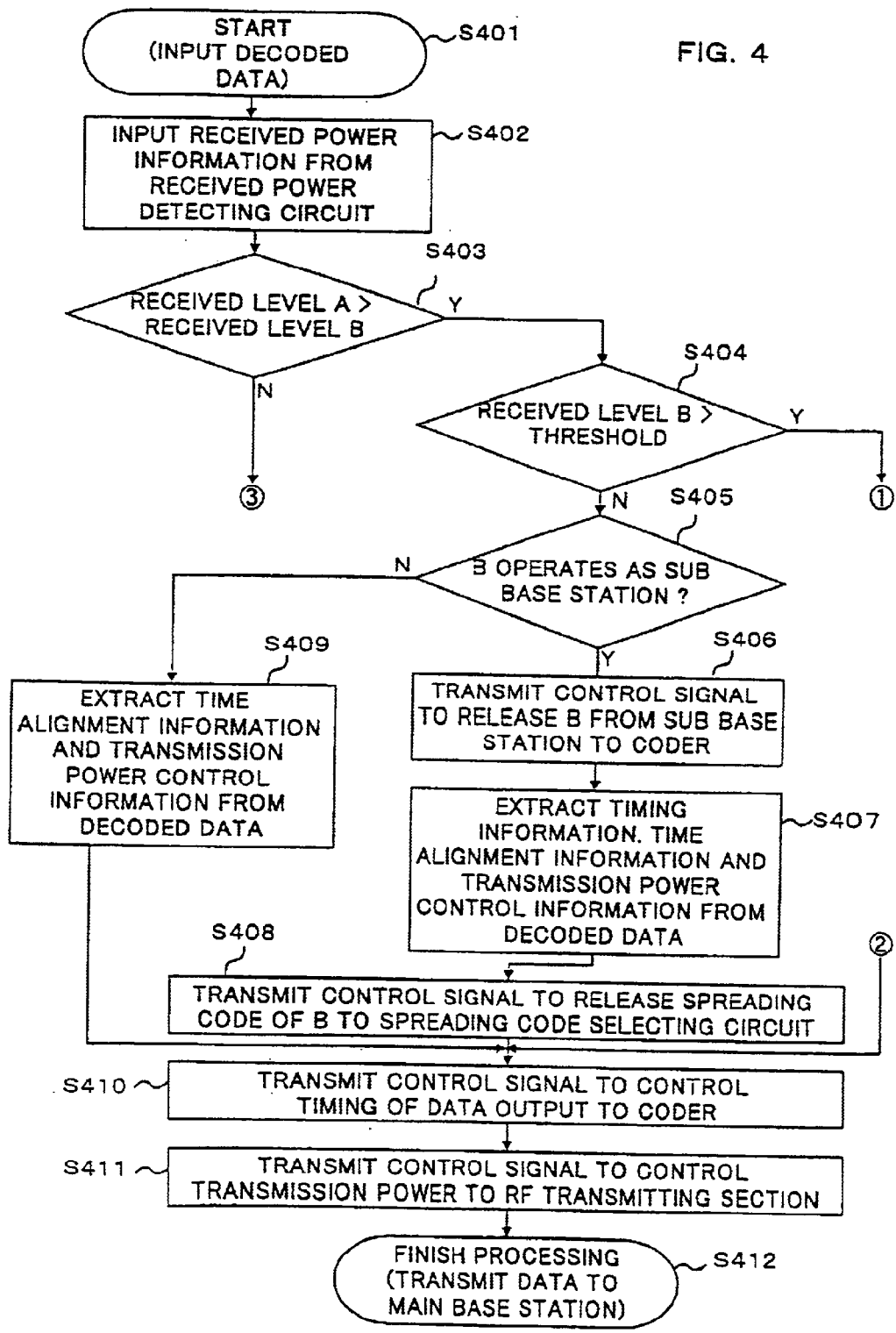
Figure 5:
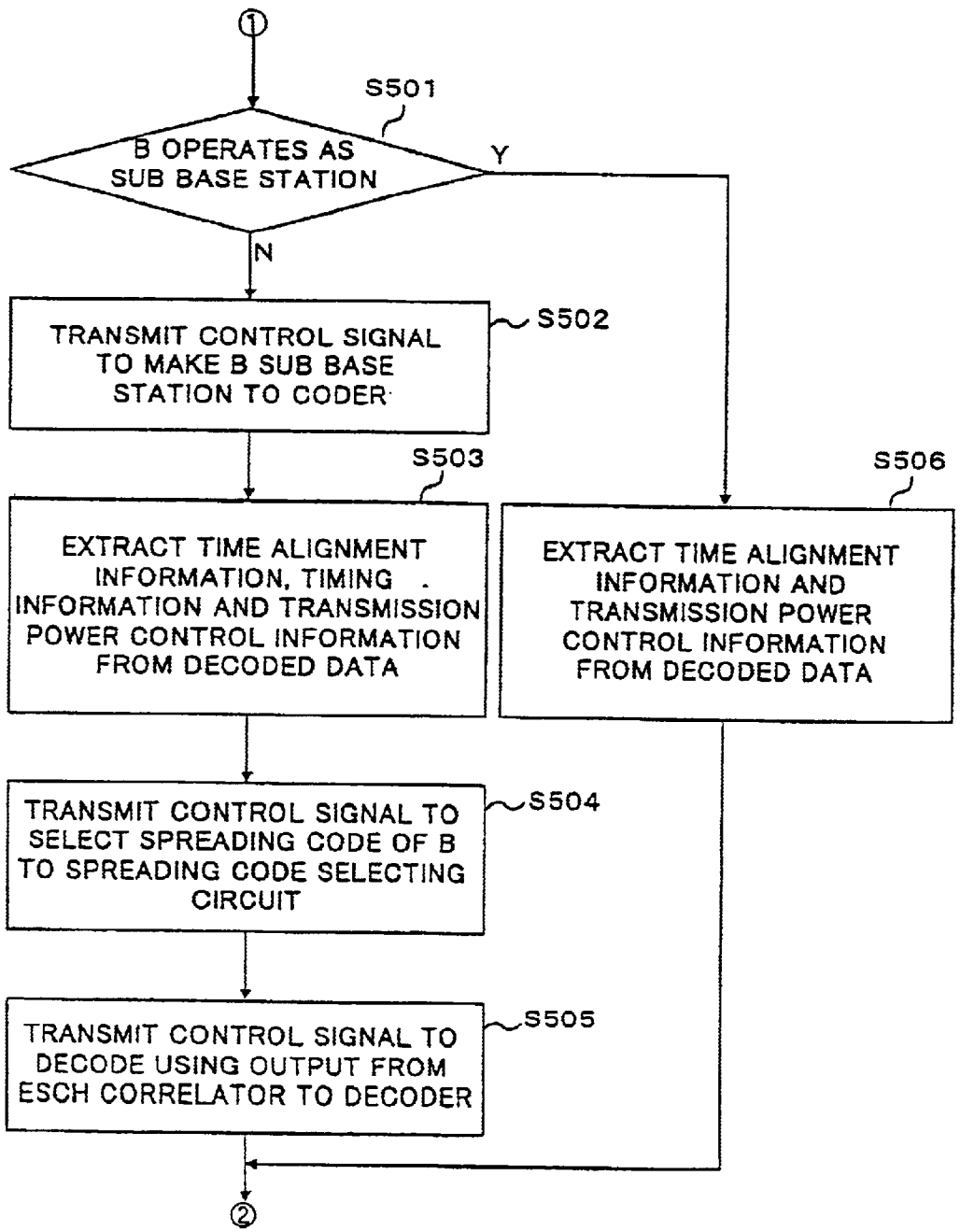

A flow of the processing at control circuit 20 of the mobile station according to this embodiment will be described next using the flowcharts in FIG. 4 to FIG. 6. In addition, base station A is assumed as a main base station in the flowcharts.

To control circuit 20, decoded data is first input from decoder 7 (S401), and then received power information from each base station is input from received power detecting circuit 12 (S402). Control circuit 20 compares the received level of base station A with that of base station B (S403). When the received level of base station B is lower than that of base station A, control circuit 20 further compares the received level of base station B with a predetermined threshold level (S404).

The following description is given to the case where a mobile station is present far away from base station B, and the received level of base station B is lower than that of base station A and also lower than a predetermined threshold level.

In this case, the mobile station communicates with only base station A and does not communicate with base station B.

In the case where base station B is operating as a sub base station (S405), control circuit 20 transmits a control signal to release base station B from a sub base station to coder 13 (S406).

Control circuit 20 next extracts timing information to release base station B from the sub base station and time alignment information and transmission power control information of base station A, which are transmitted from the base station corresponding to the control signal, from the decoded data (S407). Control circuit 20 further transmits a control signal to release the spreading code of base station B to spreading code selecting circuit 11 at a timing of the sub base station release based on the information (S408). In addition, spreading code selecting circuit 11 transmits a control signal to correlator 6 not to output data.

In addition, in the case where base station B is not operating as a sub base station (S405), control circuit 20 extracts time alignment information and transmission power control information of base station A from the decoded data (S409).

Control circuit 20 next transmits a control signal to control the timing of data output for the time alignment to base station A to coder 13 (S410), and transmits a control signal to control the transmission power to RF transmitting section 16 (S411), and then finishes the processing (S412). In addition, the data is transmitted to base station A.

The following description is given to the case where the received level of base station B is lower than that of base station A and higher than a predetermined threshold level.

When base station B is not operating as a sub base station (S501), control circuit 20 transmits a control signal to make base station B sub station to coder 13 (S502).

Control circuit 20 next extracts timing information to start communicating with base station B as a sub base station and time alignment information and transmission power control information of base station A, which are transmitted from the base station corresponding to the control signal, from the decoded data (S503). Control circuit 20 further transmits a control signal to select the spreading code of base station B to spreading code selecting circuit 11 at a timing of communicating with the sub base station based on the information (S504), and furthermore transmits a control signal to use outputs from correlator 5 and correlator 6 to decode to decoder 7 (S505). In addition, spreading code selecting circuit 11 transmits a control signal to correlator 6 to output data.

In addition, in the case where base station B is operating as a sub base station (S501) control circuit 20 extracts time alignment information and transmission power control information of base station A from the decoded data (S506).

Control circuit 20 next transmits the control signal to control the timing of data output for the time alignment to base station A to coder 13 (S410), and transmits the control signal to control the transmission power to RF transmitting section 16 (S411), and then finishes the processing (S412). In addition, the data is transmitted to base station A.

Since the mobile station obtains the data necessary for communication from a base station for the next communication before the base station is switched, it is possible to perform the processing such as synchronization acquisition for the despreading, transmission power control and time alignment in a short time, thereby making it possible to reduce the time required by the switching.

The following description is given to the case where the received level of base station B is higher than that of base station A.

Control circuit first transmits a control signal to make base station B main station and make base station A sub station to coder 13 (S601).

Control circuit 20 next extracts timing information to switch a main base station and a sub base station and time alignment information and transmission power control information of base station B, which are transmitted from the base station, from the input decoded data (S602). Control circuit 20 further transmits a control signal to spread data with the spreading code of base station B to spreading multiplex circuit 14 at a timing of switching a main base station and a sub base station (S603), a control signal to control the timing of data output to coder 13 for the time alignment for base station B (S604), a control signal to control the transmission power to RF transmitting section 16 (S605), and a control signal to switch the spreading codes of base station A and base station B to spreading code selecting circuit 11. In addition, spreading code selecting circuit 11 transmits a control signal to correlator 5 to output data using the spreading code of base station B and a control signal to correlator 6 to output data using the spreading code of base station A.

Further, control circuit 20 transmits the control signal to use outputs form correlator 5 and correlator 6 to decoder 7, and then finishes the processing (S608). In addition, the data is transmitted to base station B. After that, the main base station and the sub base station are switched.

At the time of switching a main base station and sub base station, since the mobile station has already acquired synchronization and is able to obtain the transmission power control and time alignment information in advance, it is possible to switch the base station in a short time. It is further possible to perform the base station switching control in a mobile station received burst time in the CDMA/TDD system, thereby facilitating the switching of base station.

According to the above processing, it is possible to perform the switching of base station communicating with a mobile station in a short time, it is thereby not necessary to discontinue a communication temporarily. It is further possible to suppress a deterioration of transmission quality even in the case where a mobile station is present around a boundary between two cells.

INDUSTRIAL APPLICABILITY

The present invention enables the radio communication apparatus and method appropriate to perform the switching of a base station communicating with a mobile station in a short time in a car telephone, portable telephone and others.

The present invention is not limited to the above described embodiments, and various variations and modifications may be possible without departing from the scope of the present invention.

What is claimed is:

1. A CDMA/TDD radio communication apparatus comprising:
   a power detector that detects received power of data from base stations;
   a demodulator that, when received power of data transmitted from a first base station other than a main base station in current communication is greater than a predetermined level and is less than received power of data transmitted from said main base station, selects said first base station as a sub base station, and decodes data from said sub base station with data from said main base station; and
   a controller that, when received power of data from said sub base station is less than received power of data from said main base station, performs transmission power control and time alignment for said main base station, said time alignment being timing control for transmission data, wherein said apparatus further comprises a transmitter that transmits instruction information to the main base station, to instruct said sub base station to transmit same data as data being communicated in the current communication with the main base station.

2. The CDMA/TDD radio communication apparatus according to claim 1, wherein said apparatus further comprises a switch that switches the sub base station to a new main base station and in response to switching of the sub base station to said new main base station, said controller performs transmission power control and time alignment for said new main base station, when received power of data from said sub base station exceeds received power of data from the main base station in current communication.

3. A CDMA/TDD radio communication apparatus comprising:
   a power detector that detects received power of data from base stations;
   a demodulator that, when received power of data transmitted from a first base station other than a main base station in current communication is greater than a predetermined level and is less than received power of data transmitted from said main base station, selects said first base station as a sub base station, and decodes data from said first base station with data from said main base station; and
   a controller that, when received power of data from said sub base station is less than received power of data from said main base station, performs transmission power control and time alignment for said main base station, said time alignment being timing control for transmission data, wherein, when received power of data from the sub base station is less than a predetermined level, the decoder does not decode the data from said sub base station.

4. A CDMA/TDD radio communication system comprising a plurality of base stations and a mobile station, wherein said mobile station, while communicating with a main base station:
   selects another base station with greater received power than a predetermined level and with less received power than said main base station as a sub base station, and receives same data from said sub base station and said main base station; and
   performs transmission power control and time alignment for the main base station, when received power of data from the sub base station is less than received power of data from said main base station, wherein, when received power of data from the sub base station is less than the predetermined level, the mobile station does not decode the data prom said sub base station.

5. The CDMA/TDD radio communication system according to claim 4, wherein said mobile station, when received power of data from the sub base station exceeds received power of data from the main base station in current communication, switches said sub base station to a new main base station and performs transmission power control and time alignment for said new main base station.

6. A CDMA/TDD radio Communication method comprising:
   in a mobile station, comparing received power of data from a base station other than a main base station in current communication to (i) a predetermined level and (ii) received power of data from the main base station in current communication;
   in the mobile station, when received power of data from the base station other than the main base station exceeds the predetermined level and is less than received power of transmission data from the main base station, selecting said base station as a sub base station;
   in the sub base station, transmitting to the mobile station same data as data that the main base station in current communication transmits; and
   in the mobile station, when received power of data from the sub base station is less than received power of data from the main base station, performing transmission power control and time alignment for said main base station, wherein, when received power of data from the sub base station is less than a predetermined level, the decoder does not decode the data from said sub base station.

7. The CDMA/TDD radio communication method according to claim 6, further comprising, in the mobile station, when received power of data from the sub base station exceeds received power of data from the main base station, switching the sub base station to a new main base station and performing transmission power control and time alignment for said new main base station.

* * * * *